(12) United States Patent
Kato

(10) Patent No.: US 7,614,589 B2
(45) Date of Patent: *Nov. 10, 2009

(54) VIBRATION ABSORBING CLAMP FOR PIPE

(75) Inventor: Hiroyuki Kato, Utsunomiya (JP)

(73) Assignee: Newfrey LLC, Newark, DE (US)

( * ) Notice: Subject to any disclaimer, the term of this patent is extended or adjusted under 35 U.S.C. 154(b) by 377 days.

This patent is subject to a terminal disclaimer.

(21) Appl. No.: 11/359,604

(22) Filed: Feb. 23, 2006

(65) Prior Publication Data

US 2006/0186279 A1 Aug. 24, 2006

(30) Foreign Application Priority Data

Feb. 24, 2005 (JP) ............................. 2005-049205

(51) Int. Cl.
*F16L 3/16* (2006.01)
(52) U.S. Cl. .................... 248/55; 248/68.1; 248/73; 248/74.1
(58) Field of Classification Search ............... 248/55, 248/62, 68.1, 71, 73, 74.1, 74.2; 24/555, 24/560, 564
See application file for complete search history.

(56) References Cited

U.S. PATENT DOCUMENTS

| | | | | |
|---|---|---|---|---|
| 5,954,300 A * | 9/1999 | Sturies et al. | ............... | 248/68.1 |
| 6,152,406 A * | 11/2000 | Denndou | ................... | 248/68.1 |
| 6,585,196 B2 * | 7/2003 | Nakanishi | ................... | 248/68.1 |
| 6,978,973 B1 * | 12/2005 | Gretz | ......................... | 248/74.1 |
| 7,011,277 B2 * | 3/2006 | Mizukoshi et al. | ......... | 248/68.1 |
| 7,207,528 B2 * | 4/2007 | Kato | ............................ | 248/55 |

FOREIGN PATENT DOCUMENTS

| | | |
|---|---|---|
| JP | 09-079432 | 3/1997 |
| JP | 9-184580 | 7/1997 |
| JP | 3050795 | 5/1998 |
| JP | 2001-343006 | 12/2001 |

\* cited by examiner

*Primary Examiner*—Gwendolyn Baxter
(74) *Attorney, Agent, or Firm*—Stephen R. Valancius; Michael P. Leary

(57) ABSTRACT

A vibration absorbing clamp comprises a hard plastic base, hard plastic pipe grippers for gripping pipes, and a soft plastic vibration absorbing material disposed between the base and the pipe grippers. Each pipe gripper has a receiver for receiving a pipe and elastic wings allowing the pipe to be pushed into the receiver but not removed. The base has a bottom and side walls spaced from the bottom and sides of the receivers. The sides of the receiver and the side walls of the base are connected only by hard plastic thin plate supports. The spaces formed by the bottoms and sides of the receiver and by the bottom and side walls of the base are filled with vibration absorbing material so as to envelop the thin plate supports.

16 Claims, 7 Drawing Sheets

VIBRATION ABSORBING CLAMP FOR PIPE

CROSS-REFERENCE TO RELATED APPLICATION

This application claims the benefit of Japanese Patent Application No. 2005-049205 filed Feb. 24, 2005, incorporated herein by reference.

BACKGROUND OF THE INVENTION

The present invention relates to a clamp for gripping a long component such as a pipe or wire harness to attach the long component to a support such as a car body. The invention relates more specifically to a vibration absorbing clamp that is able to prevent transmission of vibrations between a support such as a car body and a long component such as a pipe.

Vibration absorbing clamps are used to attach a long component such as a pipe or wire harness to a support such as a car body, and to prevent transmission of vibrations between the support and the long component. In many vibration absorbing clamps, a soft plastic vibration absorbing material is arranged in a long component gripper to absorb vibrations between the gripper and the long component.

In Unexamined Japanese Patent Application Publication 9-79432 (Patent Document 1), a soft buffering plastic material is placed inside a curved wall of a pipe gripper to absorb vibration and prevent axial slippage of the pipe. When strong force is applied to the pipe axially, C-shaped edges along the curved wall of a recess in the pipe gripper and the soft buffering plastic material attached to the curved wall prevent separation of the soft plastic material.

In Unexamined Japanese Patent Application Publication 9-184580 (Patent Document 2), a vibration absorbing clamp for a pipe prevents transmission of vibration between a pipe and a support such as a car body. This vibration absorbing clamp comprises hard plastic pipe grippers for gripping pipes, and a vibration damping material disposed between a base and pipe grippers to absorb vibrations.

In Registered Japanese Utility Model 3050795 (Patent Document 3), a vibration absorbing clamp for a pipe prevents transmission of vibration between a pipe and a support such as a car body. This vibration absorbing clamp comprises hard plastic pipe grippers for gripping pipes, a hard plastic base for holding the pipe grippers and attachment to a support, and an elastomer vibration absorbing material disposed between the base and the pipe grippers to absorb vibrations between the pipes gripped by the pipe gripper and the support attached to the base.

In Unexamined Japanese Patent Application Publication 2001-343006 (Patent Document 4), a vibration absorbing clamp prevents transmission of vibration between a long component such as a pipe and a support such as a car body. This vibration absorbing clamp comprises hard plastic pipe grippers for gripping pipes, a separate hard plastic base for supporting the pipe grippers, and a vibration absorbing material disposed between the base and the pipe grippers to absorb vibrations.

The clamp in Patent Document 1 prevents separation of the soft buffering plastic material used to prevent slippage. However, the vibration absorbing function is insufficient. If the soft buffering plastic material is made thicker to improve the vibration absorbing effect, a pipe is directly gripped by the soft buffering plastic material, and the gripping strength is weakened.

The clamp in Patent Document 2 does not have a vibration absorbing material between the pipe gripper and the pipe. Thus, the gripping strength of the hard plastic pipe gripper is sufficient. The vibration absorbing effect is also better because the vibration absorbing material is disposed between the pipe gripper and the base. However, because the pipe gripper and the base are connected by a thin plate support at the bottom of the pipe gripper and the bottom of the base, vibration is transmitted via the thin plate support. The thin plate support also weakens the clamp. If the thin plate support breaks, the pipe gripped by the pipe gripper becomes detached from the base.

In the first example of the clamp in Patent Document 3, space between the pipe gripper and the base is filled with a vibration absorbing material to improve the vibration absorbing effect. However, because the pipe gripper and the base are separate components, the pipe gripper can become separated from the base. This undermines the pipe gripping function of the pipe gripper. Like the clamp in Patent Document 2, the clamp in the second example in Patent Document 3 has a base and a pipe gripper that are connected to one another by a thin plate support at the bottom of the pipe gripper and the bottom of the base. While the connection strength is better than in the first example, the vibration damping leaves room for improvement, like the clamp in Patent Document 2, and the connection strength is insufficient.

Because the clamp in Patent Document 4 has a pipe gripper and a base that are completely separate with an elastomer resin vibration absorbing material filling the space between the pipe gripper and the base, the vibration absorbing effect is high. In order to keep the base from becoming separated from the pipe gripper, a latch plate is disposed between the bottom of the pipe gripper and the bottom of the base. However, because the pipe gripper is separate from the base, sufficient force applied to the base lengthwise with respect to the pipe can cause the pipe gripper to detach from the base.

BRIEF DESCRIPTION OF THE INVENTION

An object of the present invention is to provide an improved vibration absorbing clamp for a pipe or other long component that is able to achieve a high vibration absorbing function, hold a pipe with sufficient holding strength, and minimize the disconnection of a pipe gripper from a base.

In one embodiment, the present invention is a vibration absorbing clamp for a pipe comprising a hard plastic base, hard plastic pipe grippers for gripping pipes, and a soft plastic vibration absorbing material disposed between the base and the pipe grippers, wherein a pipe gripper has a receiver for receiving a pipe and elastic wings allowing the pipe to be pushed into the receiver but not removed. The base has a bottom and side walls surrounding and spaced from the bottom and sides of the receiver. The sides of the receiver and the side walls of the base are connected only by hard plastic thin plates that maintain space between the bottom and sides of the receiver and the bottom and side walls of the base that is filled with a vibration absorbing material so as to envelop the thin plates.

In this vibration absorbing clamp, vibration between the base and a pipe gripper is effectively absorbed by the vibration absorbing material. The space between the base and the pipe gripper is maintained at a certain interval by thin plates and is filled with a vibration absorbing material. Because the side walls of the base and the sides of a receiver in the pipe gripper are connected to one another only by the thin plates, the vibration absorbing effect between the base and the pipe gripper is improved. Because the pipe or other long component is gripped directly by a hard plastic pipe gripper, the gripping force on the pipe is sufficient.

In this vibration absorbing clamp, a receiver preferably has nearly vertical sides and a curved bottom for receiving a long cylindrical component such as a pipe. The sides of the pipe gripper extend downward towards the bottom of the base and are integral with sides of a U-shaped frame having a horizontal portion in space between the curved receiver bottom and the base bottom. This minimizes the risk of the pipe gripper becoming detached from the base.

In this vibration absorbing clamp, a thin plate is formed integrally with the frame and a bridge near the bottom of the base. This maintains a high vibration absorbing effect while increasing the connection strength between the base and the pipe gripper. The size of a space between a side of the receiver and an adjacent side wall of the base is preferably determined by the maximum diameter of a long cylindrical component such as a pipe to be accommodated by the receiver. This restricts the range of movement of a long component such as a pipe. Preferably, the thin plates at the sides of a receiver are connected on an incline at different heights on the side of the receiver and the side wall of the base. This increases the elasticity on the side of the receiver in the pipe gripper while easily accommodating a long component such as a pipe. Preferably, a fixer for receiving and engaging a rod-shaped stud on a support such as a car body is disposed on the base near a pipe gripper. One side of the fixer also forms one side of a receiver in the pipe gripper.

BRIEF DESCRIPTION OF THE DRAWINGS

The invention will be further described in conjunction with the accompanying drawings, which illustrated a preferred (best mode) embodiment, and wherein.

DETAILED DESCRIPTION OF THE INVENTION

Figure 15:
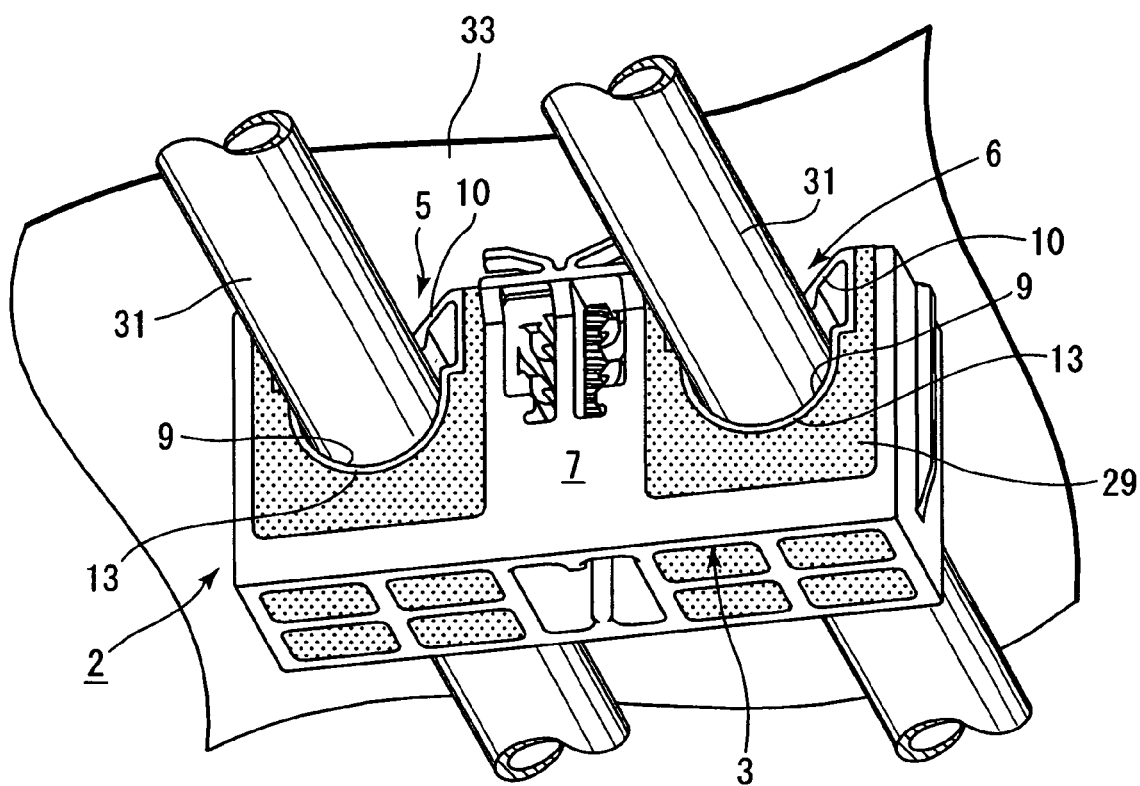
FIG. 15 is a perspective view of pipes attached to a support using the vibration absorbing clamp in FIG. 7.

The following is an explanation with reference to the drawings of a vibration absorbing clamp for a long component such as a fuel pipe, brake line or wire harness in a first embodiment of the present invention. FIG. 1 through FIG. 6 show a primary molded clamp 1 not loaded with a vibration absorbing material. FIG. 7 through FIG. 14 show a secondary molded clamp 1 (final product), which is the primary molded clamp 1 in FIG. 1 through FIG. 6 loaded with a vibration absorbing material. This is the vibration absorbing clamp 2 in the first embodiment of the present invention. FIG. 15 shows a plurality of long components, such as brake lines or fuel pipes, attached to a support such as a car body using the vibration absorbing clamp 2.

The following is an explanation of the primary molded clamp 1 with reference to FIG. 1 through FIG. 6. The clamp 1 is made of a hard plastic material with sufficient rigidity. The primary molded clamp 1 includes a base 3 and pipe grippers 5, 6 for pipe or elongated objects. To simplify the description, pipe will frequently be referred to herein as representative of a long object or component. It will be apparent that the invention is useful with other such objects or components, such as wire harness, for example.

The base 3 has a stud fixer 7 for fixing the clamp to a support such as a car body. The fixer does not have to be a stud fixer 7. It can be an anchor-shaped clip, for example, that is inserted into and engaged with a mounting hole in the support. The number, shape and size of the grippers 5, 6 depend on the number and type of long components to be attached, whether it is a fuel pipe or brake line, for example. As explained below, the base 3 is connected to the pipe grippers 5, 6 only by thin support plates, but the entire primary clamp 1 is preferably an integrally molded product made of a hard plastic material.

Each of the pipe grippers 5, 6 includes a receiver 9 for receiving a pipe and elastic wings 10 allowing a pipe to be pushed into the receiver 9 but not easily removed. More specifically, the receiver 9 has a pair of nearly vertical sides 11 and a curved bottom 13 for receiving a cylindrical object such as a pipe. The elastic wings 10 are plate-shaped and extend on an incline from the top of the pair of sides 11 toward the curved bottom. The tips make contact with a pipe resting on the curved bottom 13 to keep it from coming out of the receiver 9. The vertical sides of each pipe gripper 5, 6 extend downward towards the bottom 14 of the base 3 and join the vertical legs of a U-shaped frame 15.

Figure 1:
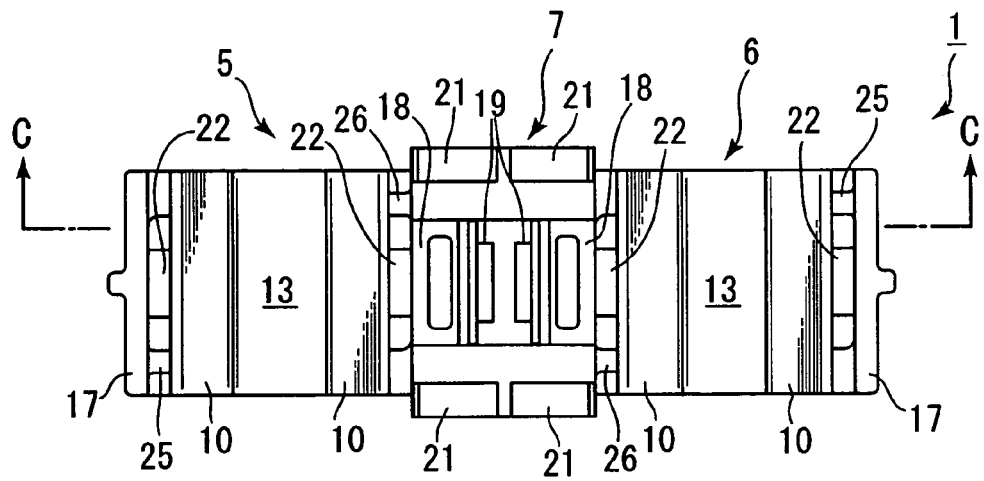
FIG. 1 is a plan view of a primary clamp in a first example, before being loaded with vibration absorbing material.
Figure 2:
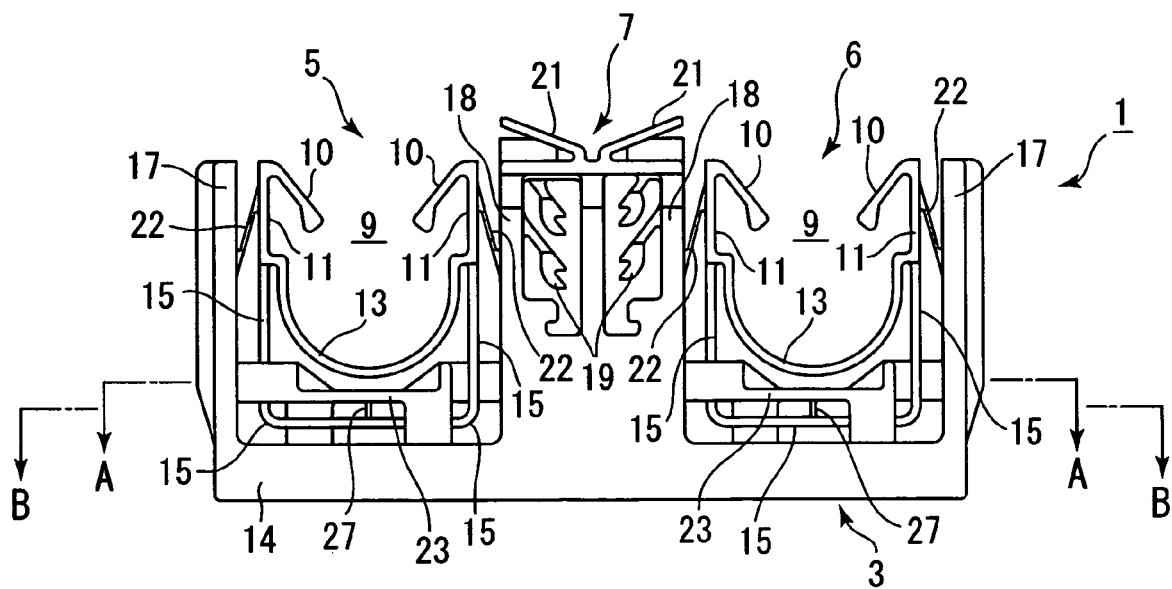
FIG. 2 is a front view of the clamp in FIG. 1.
Figure 3:
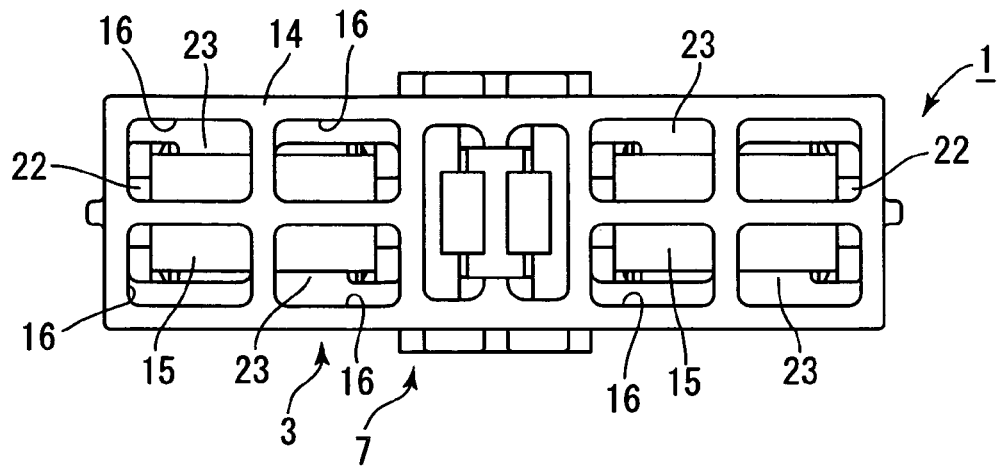
FIG. 3 is a bottom view of the clamp in FIG. 1.
Figure 5:
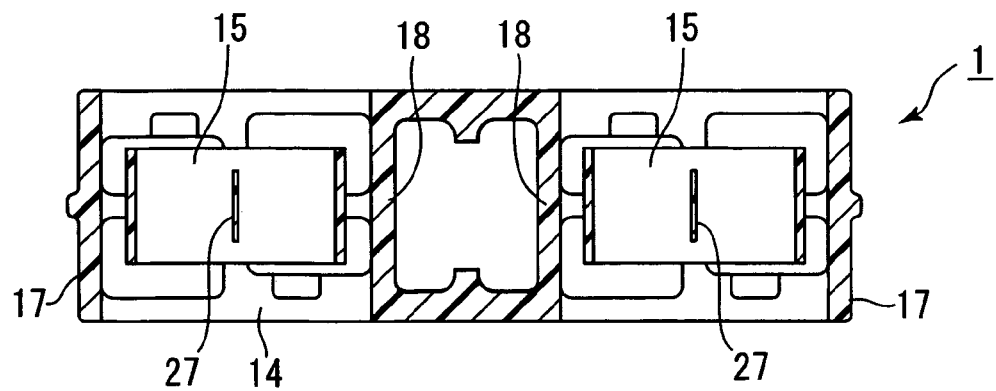
FIG. 5 is a cross-sectional view of the clamp from line B-B in FIG. 2.
Figure 6:
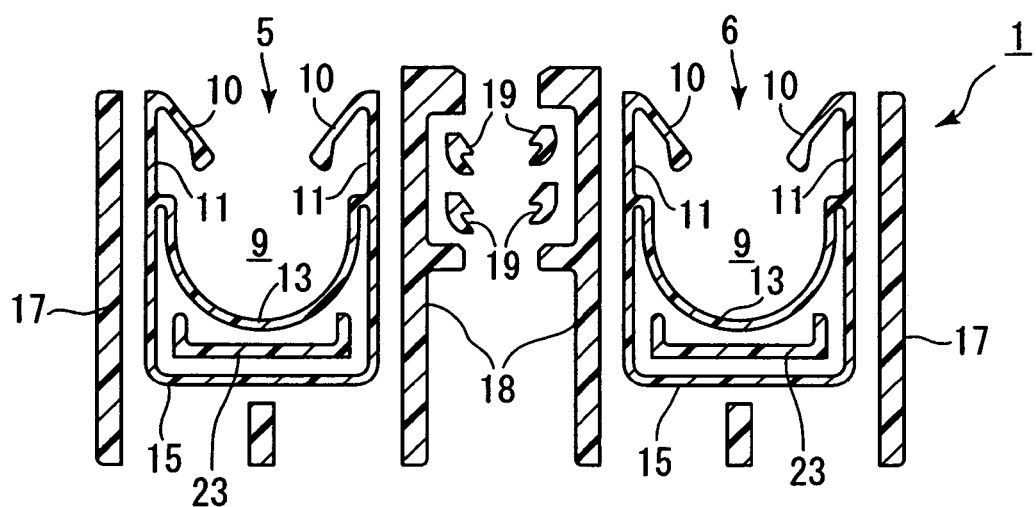
FIG. 6 is a cross-sectional view of the clamp from line C-C in FIG. 1.
Figure 7:
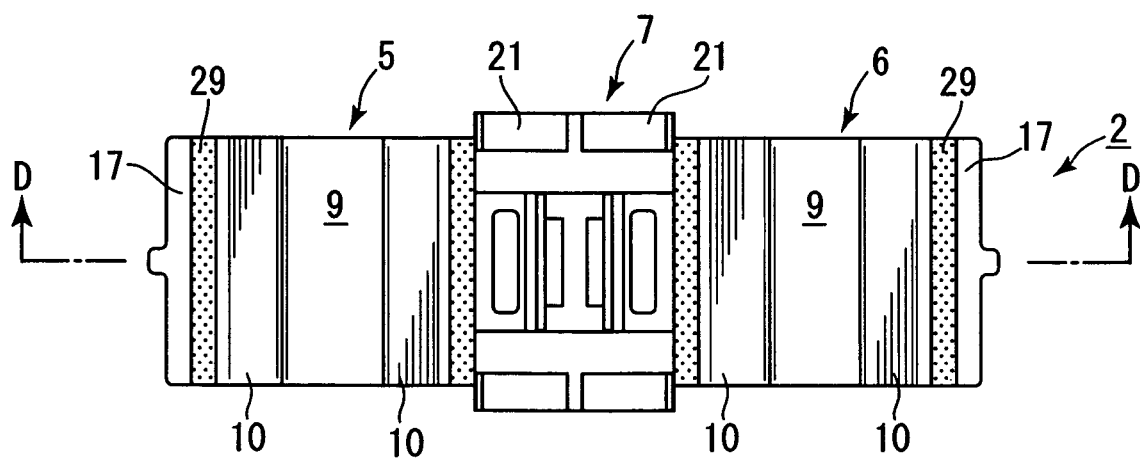
FIG. 7 is a plan view of a vibration absorbing clamp of the first example in FIG. 1 after the primary clamp is loaded with vibration absorbing material to form a secondary clamp.
Figure 8:
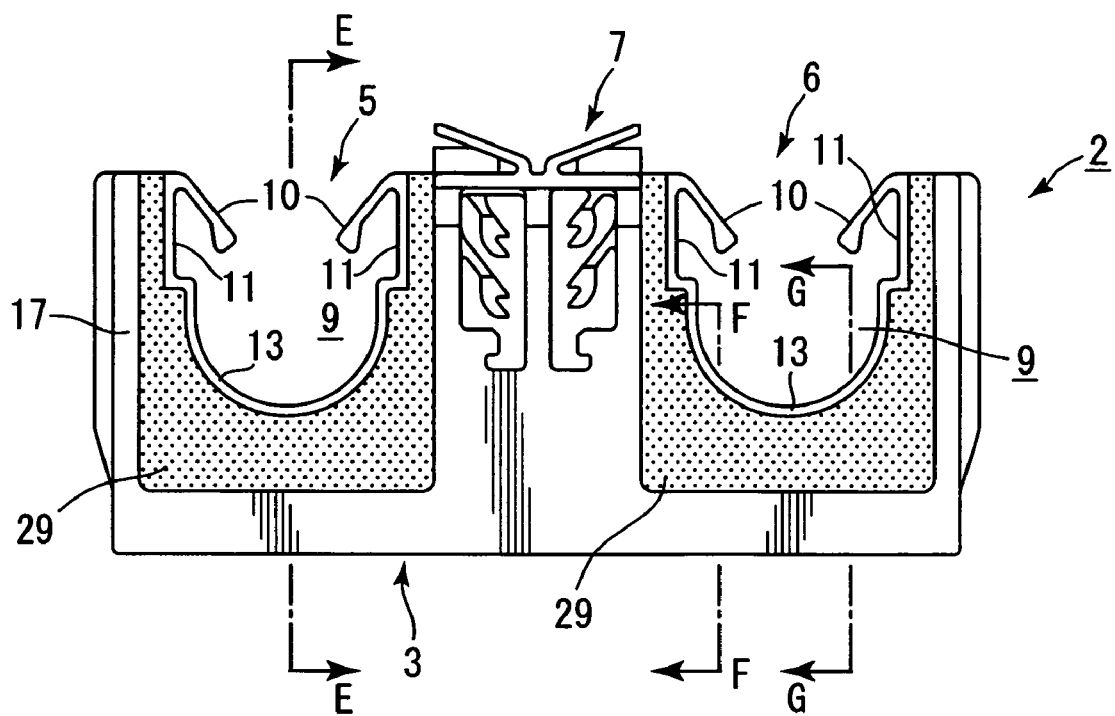
FIG. 8 is a front view of the vibration absorbing clamp in FIG. 7.

As shown in FIG. 3 and FIG. 5, the frame 15 is formed of a flat plate material. As shown in FIG. 2 and FIG. 6, there is space between the frame 15 and the curved bottom 13. As shown in FIG. 2, the base 3 has side walls 17, 18 spaced outwardly from respective sides 11 of the receivers 9 in the pipe grippers 5, 6. As shown in FIG. 3, the bottom 14 of the base 3 is formed with openings 16, which allow for molding of the U-shaped frames 15 while maintaining sufficient strength.

The stud fixer 7 is hollow in the center for receiving a stud. Two pairs of engagers (e.g., pawls) 19 extend downward from the top towards the center of the stud fixer 7 to engage threads or circumferential grooves in a stud. Two pairs of spring plates 21 are formed atop the clamp to prevent slippage when the clamp is attached to a support.

In order to maintain space between the receivers 9 in the pipe grippers 5, 6 and the base 3, the sides 11, 11 of the receivers 9 are connected to the side walls 17, 18 of the base by hard plastic thin plates (webs) 22. Because the pipe grippers 5, 6 and the base 3 are nearly spaced separate components, transmission of vibrations between the pipe grippers 5, 6 and the base 3 can occur only via the thin plates 22, i.e., hardly any vibration at all. As shown in FIG. 2, the thin plates 22 are connected on an incline at different heights on the sides 11 of the receivers 9 and the side walls 17, 18 of the base 3.

This increases the elasticity on the sides of the receivers while long components such as pipes are easily accommodated. The longer the thin plate 22, the greater the damping effect on the transmission of vibrations. As explained in greater detail below, the space between the receivers 9 and the side walls 17, 18 and the bottom 14 of the base 3 is filled with a soft plastic vibration absorbing material so as to envelop the thin plates 22. This maintains a high vibration absorbing effect. If the thin plates 22 are long, the contact area with the vibration absorbing material is increased. This improves the vibration absorbing effect even further.

Preferably, the size of the spaces between the sides 11 of the receivers 9 and the side walls 17, 18 of the base is determined by the maximum diameter of a long cylindrical component such as a pipe that can be accommodated by the receivers 9. In other words, the spaces between the sides 11 of the receivers 9 and the side walls 17, 18 of the base are determined by the maximum tolerance for long cylindrical components such as a pipe. This restricts the left to right movement of pipes against the side walls 11 of the receivers 9 due to vibration and keeps the pipes from coming loose. This makes the grip more secure. Because the thin plates 22 maintain space for easy two-color molding or injection molding of the vibration absorbing material, the transmission of vibrations is reduced.

Figure 4:
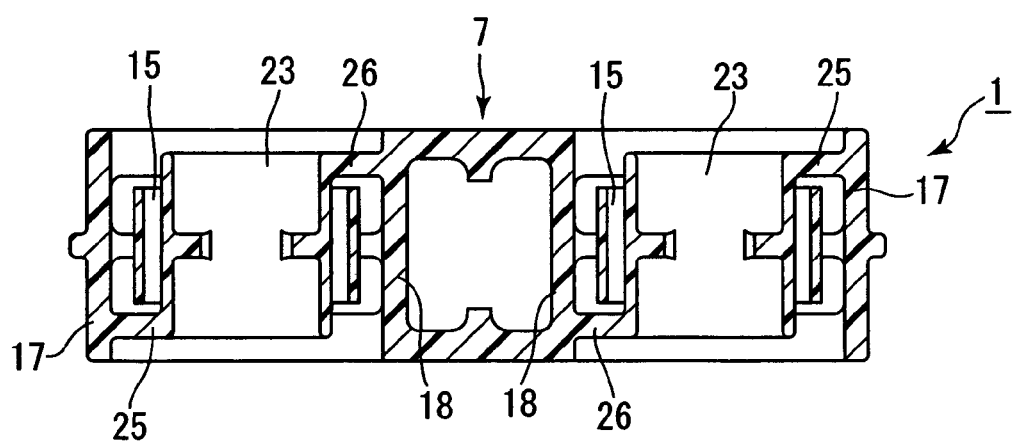
FIG. 4 is a cross-sectional view of the clamp from line A-A in FIG. 2.

The base 3 has bridges 23 that allow each U-shaped frame 15 and the curved bottom 13 of a receiver 9 to extend into the space between the frame 15 and the curved bottom 13 without coming into contact with one another. The bridges 23 are fully visible in FIG. 2, FIG. 4 and FIG. 6, and partially visible in FIG. 3. If thin plates 22 are severed, the bridges 23 also keep the receivers 9 of the pipe grippers 5, 6 from coming into contact with the base 3. As shown in FIG. 4, each bridge 23 has a plate shape. It is sized according to the bottom surface of the curved bottom 13 of an associated receiver 9. One edge 25 (FIG. 4) is connected to a side wall 17 and another edge 26 (FIG. 13) is connected to the base bottom 14. This fixes and integrates the bridge with the base 3. Each bridge 23, as shown in FIG. 6, is formed to securely embrace a curved bottom 13 so that the U-shaped frame 15 and the curved bottom 13 do not come into contact with one another in the space between the frame 15 and the curved bottom 13 of the receiver 9.

As a result, the transmission of vibration from the pipe grippers 5, 6 remains negligible while the chance of the pipe grippers 5, 6 separating from the base 3 is minimized. The space between the bridge 23, the curved bottom 13 and the frame 15 is filled with a soft plastic vibration absorbing material through two-color molding or injection molding, and the space is maintained during the molding process. As shown in FIG. 2 and FIG. 5, a thin plate (web) 27 is disposed to connect a center position of a frame 15 to a center position of a bridge 23. The thin plate 27 reduces the transmission of vibration. Because the thin plate 27 connects the frame 15 to the bridge 23 and not the curved bottom 13 of the receiver 9, vibrations are not transmitted to the curved bottom 13.

As shown in FIG. 7 through FIG. 14, the spaces between the pipe grippers 5, 6 and base 3 in the primary molded clamp 1 are filled with a soft plastic vibration absorbing material 29 to form a secondary molded clamp, i.e., the vibration absorbing clamp 2 of the present invention.

As shown in FIG. 2 and FIG. 6, the primary molded clamp 1 has spaces between the side walls 11 of the receivers 9 in the pipe grippers 5, 6 and the side walls 17, 18 of the base 3, spaces between the curved bottoms 13 of the receivers 9 and the frames 15, and spaces between the bridges 23 and the curved bottoms 13 and between the bridges 23 and the frames 15. These spaces are filled with the soft plastic vibration absorbing material 29, using two-color injection molding, for example. This reduces the number of components and the number of assembly steps. The soft plastic vibration absorbing material is typically a thermoplastic elastomer (TPE).

In one example of a molding process, a mold is placed around the bottom 14 and side walls 17, 18 of the base 3 and the sides 11 and curved bottoms 13 of the receivers 9 in the pipe grippers 5, 6 in the portion of the primary molded clamp 1 with the pipe grippers 5, 6. Soft plastic material suitable for vibration absorption is melted, injected and allowed to harden inside the mold. The soft plastic vibration absorbing material 29 fills the spaces between the sides 11 of the receivers 9 and the side walls 17, 18 of the base 3 so as to surround the thin plates 22. The soft plastic vibration absorbing material 29 also fills the spaces between the curved bottoms 13 of the receivers 9 and the frames 15, including the spaces between the bridges 23 and the curved bottoms 13 and the spaces between the bridges 23 and the frames 15, so that the thin plates 27 between the bridges 23 and the frames 15 are surrounded.

Figure 9:
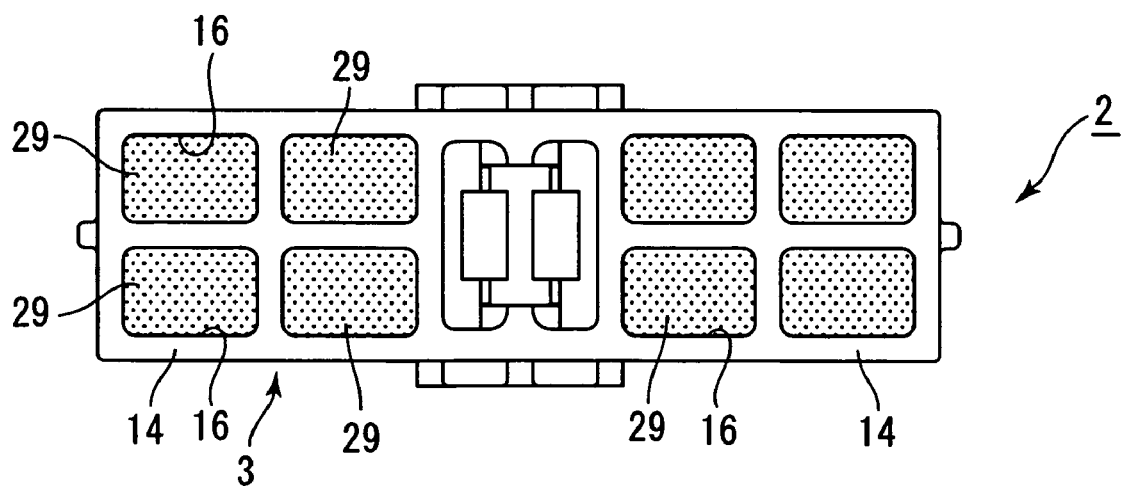
FIG. 9 is a bottom view of the vibration absorbing clamp in FIG. 7.
Figure 10:
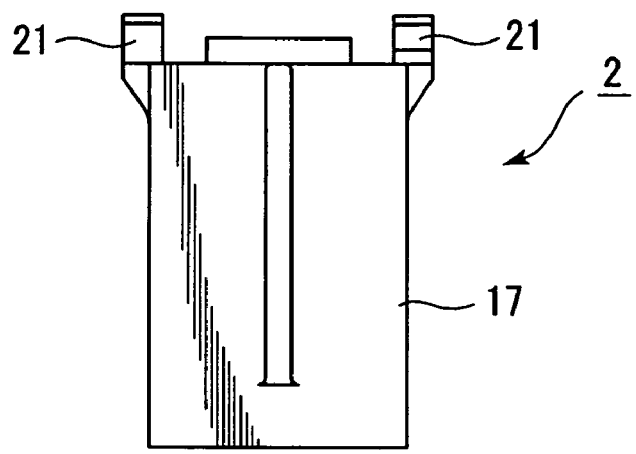
FIG. 10 is a side view of the vibration absorbing clamp in FIG. 7.
Figure 11:
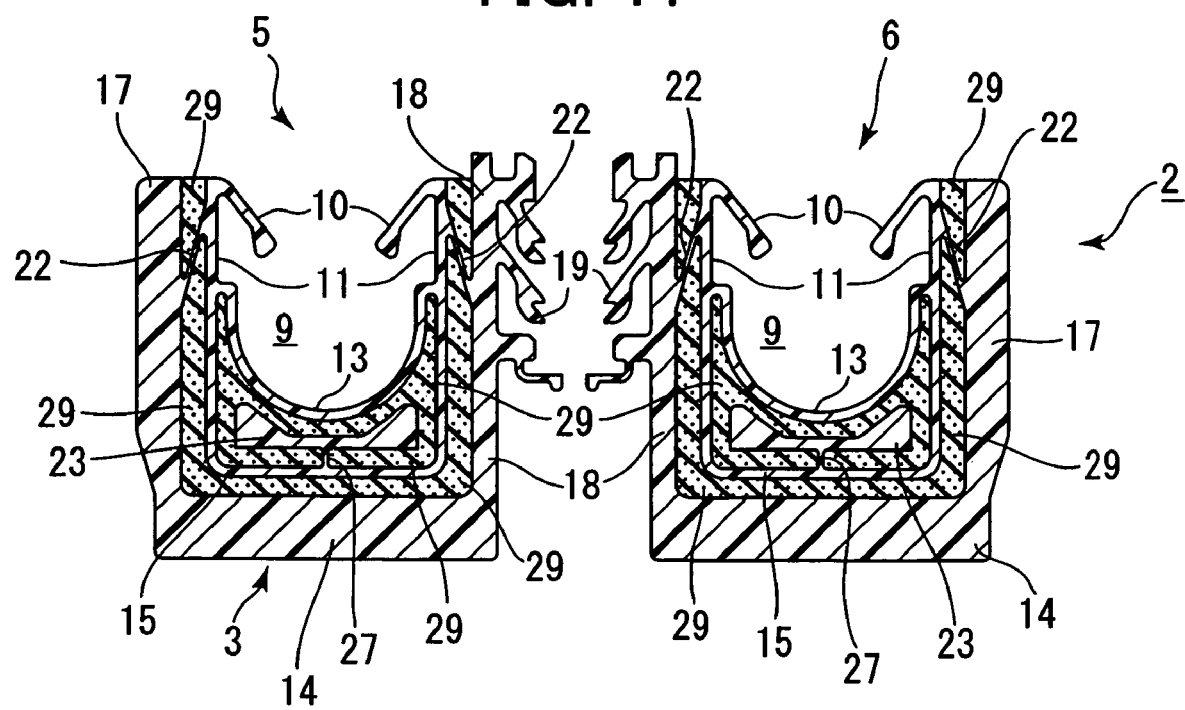
FIG. 11 is a cross-sectional view of the vibration absorbing clamp from line D-D in FIG. 7.
Figure 12:
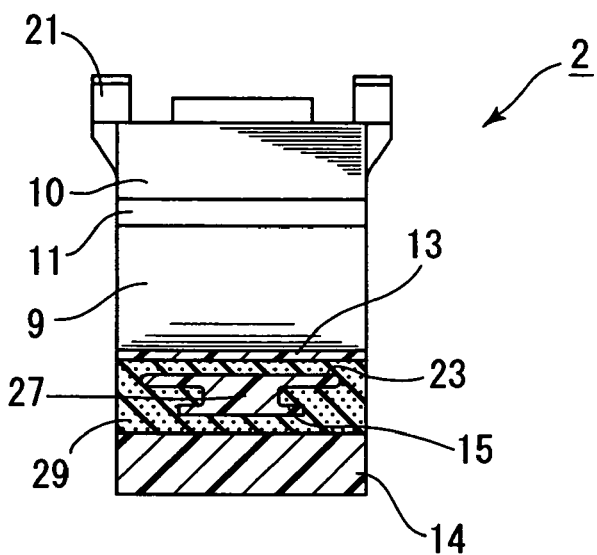
FIG. 12 is a cross-sectional view of the vibration absorbing clamp from line E-E in FIG. 8.
Figure 13:
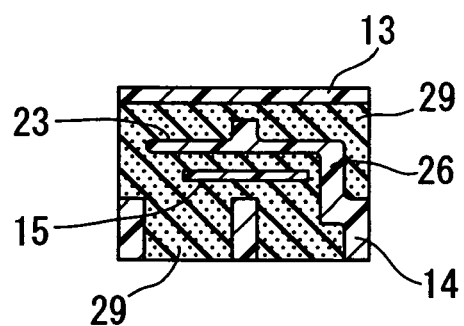
FIG. 13 is a cross-sectional view of the vibration absorbing clamp from line F-F in FIG. 8.
Figure 14:
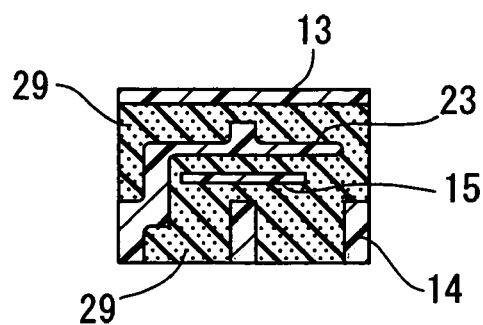
FIG. 14 is a cross-sectional view of the vibration absorbing clamp from line G-G in FIG. 8.

Because the spaces between the base 3 and the pipe grippers 5, 6 are filled with soft plastic vibration absorbing material 29, vibrations between the base 3 and the pipe grippers 5, 6 are effectively absorbed by the soft plastic vibration absorbing material 29. Because the spaces between the base 3 and the pipe grippers 5, 6 are maintained by the thin plates 22, they are filled properly with the soft plastic vibration absorbing material. Because the base side walls 17, 18 and the sides 11 of the receivers 9 are connected only by the thin plates 22, the absorption of vibrations between the base 3 and the pipe grippers 5, 6 is even more effective. As shown in FIG. 9, the openings 16 formed in the base bottom 14 allow for filling with soft plastic vibration absorbing material 29 and for the release of soft plastic vibration absorbing material 29 to the outside. As a result, vibration energy transmitted to the vibration absorbing material 29 is allowed to escape to the outside.

FIG. 15 shows, somewhat diagrammatically, the attachment of pipes 30, 31 to a car body panel 33 using the vibration absorbing clamp 2. The clamp 2 can be supported on the car body panel 33 by a stud extending from the panel into the stud fixer 7, with the spring plates 21 resiliently deflected by the panel to increase security of the mounting of the clamp on the panel. When the pipes 30, 31 are inserted into the pipe grippers 5, 6, the elastic wings 10 bend to allow the pipes 30, 31 to be received by the receivers 9. Once the pipes are resting on the curved bottoms 13 of the receivers 9, the elastic wings 10 return to their original position. Pressure is thus applied to the sides of the pipes 30, 31, and they are gripped by the pipe grippers 5, 6. The pipes 30, 31 gripped by the pipe grippers 5, 6 in the vibration absorbing clamp 2 are separated from the base 3 by the soft plastic vibration absorbing material 29. As a result, hardly any vibration is transmitted from the pipes 30, 31 to the base 3 or from the base 3 to the pipes 30, 31. The result is high vibration absorption. Because the pipes 30, 31 are gripped directly by the hard plastic pipe grippers 5, 6, without intervening vibration absorbing material, the pipes are gripped with sufficient gripping strength to prevent changes in the positioning of the pipes with respect to the elastic wings.

While a preferred embodiment of the invention has been shown and described, changes can be made without departing from the principles and spirit of the invention, the scope of which is defined in the claims which follow. For example, while terms such as "top" . . . "bottom" . . . "vertical" . . . and "horizontal" are used in the foregoing description of the invention, it is to be understood that these terms have been used to set forth relative positions of parts and are not intended to limit the physical orientation of clamps of the invention.

What is claimed is:

1. A vibration absorbing clamp for a long object, comprising:
   a hard plastic base;
   at least one hard plastic gripper; and
   a soft plastic vibration absorbing material disposed between the base and said gripper,
   wherein said gripper has a receiver for receiving the object and elastic wings allowing the object to be pushed into the receiver but not to be easily removed therefrom,
   wherein the base has a bottom and side walls surrounding and spaced from a bottom and sides of said receiver,
   wherein sides of the receiver and the side walls of the base are connected by hard plastic thin plates that maintain space therebetween, and wherein spaces between the bottom and sides of the receiver and the bottom and side walls of the base are filled with the vibration absorbing material.

2. The vibration absorbing clamp described in claim 1, wherein the receiver has nearly vertical sides and a curved bottom for receiving a long cylindrical object, and wherein the sides of the gripper extend downward to sides of a U-shaped frame having a bottom that extends horizontally in the space between the curved receiver bottom and the base bottom.

3. The vibration absorbing clamp described in claim 2, wherein the base has a bridge in space between the frame bottom and an adjacent curved receiver bottom that prevents the frame bottom and the receiver bottom from coming into contact with one another.

4. The vibration absorbing clamp described in claim 3, wherein a thin plate integrally connects the frame bottom and an adjacent bridge.

5. The vibration absorbing clamp described in claim 1, wherein the thin plates are connected at different heights on the sides of said receiver and adjacent side walls of the base.

6. The vibration absorbing clamp described in claim 1, wherein a fixer for receiving and engaging a stud on a support is disposed on the base near a gripper, and wherein one side of the fixer also forms one side of the receiver in that gripper.

7. The vibration absorbing clamp of claim 1, wherein the sides of the receiver and the side walls of the base are connected only by the hard plastic thin plates.

8. The vibration absorbing clamp of claim 7, wherein the receiver has nearly vertical sides and a curved bottom for receiving a long cylindrical object, and wherein the sides of the gripper extend downward to sides of a U-shaped frame having a bottom that extends horizontally in the space between the curved receiver bottom and the base bottom.

9. The vibration absorbing clamp of claim 7, wherein the receiver, the base and the hard plastic thin plates are integrally molded.

10. The vibration absorbing clamp described in claim 7, wherein the thin plates are connected at different heights on the sides of said receiver and adjacent side walls of the base.

11. The vibration absorbing clamp described in claim 7, wherein the spaces between the bottom and sides of the receiver and the bottom and side walls of the base are completely filled with vibration absorbing material.

12. A vibration absorbing clamp for a long object, comprising: a base having a bottom and a pair of spaced side walls; a long object gripper having a receiver that includes a pair of sides adjacent to and spaced from respective side walls of the base and having a bottom joining the sides of the receiver and separated from the bottom of the base; a frame having a pair of sides extending from respective sides of the receiver and having a bottom joining the sides of the frame and separated from the bottom of the receiver and the bottom of the base; a bridge between the bottom of the receiver and the bottom of the frame, separated therefrom, and connected to the base; webs connecting respective sides of the receiver and side walls of the base and connecting the bridge to the bottom of the frame; and vibration absorbing material in spaces between the sides of the receiver and respective side walls of the base, between the sides of the frame and respective side walls of the base, between the bottom of the frame and the bottom of the base, between the bottom of the frame and the bridge, and between the bridge and the bottom of the receiver, such that the frame, the bridge, and the webs are enveloped by vibration absorbing material.

13. The vibration absorbing clamp described in claim 12, wherein the bridge extends along the bottom of the frame, has one end connected to a side wall of the base and another end connected to the bottom of the base, and wherein the web connecting the bridge to the bottom of the frame extends therebetween substantially centrally.

14. The vibration absorbing clamp described in claim 12, wherein the base has a central portion constructed to mount the base on a support, and wherein the construction of the clamp, as recited, is duplicated at opposite sides of the central portion.

15. The vibration absorbing clamp described in claim 12, wherein the sides of the receiver have flexible wings that permit the insertion of a long object into the receiver and that retain the inserted object in the receiver.

16. The vibration absorbing clamp described in claim 12, wherein the vibration absorbing material is softer than the material of the base, the receiver, the frame, and the bridge, and wherein an inner surface of the bottom of the receiver is devoid of vibration absorbing material.

* * * * *